Aug. 2, 1966 M. RABINOWITZ 3,264,586

VARIABLE ATTENUATOR FOR U.H.F. AND MICROWAVE CIRCUITS

Filed Dec. 27, 1963 2 Sheets-Sheet 1

INVENTOR.
Martin Rabinowitz by Greene and Durr
ATTORNEYS.

INVENTOR.
Martin Rabinowitz
by Greene and Durr
ATTORNEYS

United States Patent Office 3,264,586

Patented August 2, 1966

3,264,586

VARIABLE ATTENUATOR FOR U.H.F. AND MICROWAVE CIRCUITS

Martin Rabinowitz, Ardsley, N.Y., assignor to Premier Microwave Corporation, Port Chester, N.Y., a corporation of New York Filed Dec. 27, 1963, Ser. No. 333,833
2 Claims. (Cl. 333—81)

This invention relates to a microwave variable attenuator for U.H.F. and microwave circuits.

An attenuator is a device which reduces the amplitude of an electrical signal without changing its waveshape. A microwave attenuator is a device which utilizes transmission line elements to perform said function.

In the microwave range, the wavelengths are small enough to correspond to the dimensions of electrical components and laboratory equipment with which an attenuator may be used for laboratory measurements. To prevent radiation of energy, the usual circuitry for microwaves includes hollow metallic pipes and metallic enclosures.

A proper attenuator should also be constructed to prevent radiation of energy and to be of proper dimensions to accommodate the small wavelengths of energy in that range.

The attenuator disclosed herein is designed to utilize resistance means as energy-absorbing means to diminish the amount of energy fed from an input circuit to an output or load circuit to thereby diminish amplitude without affecting wavelength.

Where the energy from a supply source impinges on an impedance device, such as a resistor, and is only partially absorbed, the remainder of such incident energy is reflected back toward the supply source, or is partially reflected and partially transmitted, depending upon the circuitry, if any, beyond the resistor.

In the present case, for the purpose of the attenuator function, it is desired that the resister serve to absorb part of an applied energy quantity, so the remainder will be reflected and available to serve as a measurable part for use in a test or load circuit.

It becomes necessary, however, to prevent the reflected energy from travelling back to the supply source.

The attenuator herein is therefore constructed to function between a supply source and a test or load circuit, to absorb part of an energy quantity from the supply source, in suitable resistance means, and is also constructed to function to prevent the return of any reflected energy back to the supply source, while at the same time directing a definite part of such reflected energy into an output path leading to the test or load circuit.

In order to prevent any of such reflected energy from returning to the supply source, this invention provides for the generation of an auxiliary quantity of energy equal to the quantity of such reflected energy, and the auxiliary quantity of energy in appropriate phase relations, first to cause a selected part of the reflected energy to be counteracted and cancelled by a correspondingly equal part in opposed phase relation from the auxiliary quantity, and, second, at the same time, to cause the remainder part of the reflected energy to be additively combined with a correspondingly equal part in in-phase relation from the auxiliary quantity, to provide the output quantity from the attenuator for delivery to the load.

The part of reflected energy which is opposed and counter-balanced and then cancelled, is a part of the energy that would otherwise return to the supply source. The other part of the reflected energy, which is additively combined with the in-phase part of the auxiliary quantity, is then transmitted to the test or load circuit.

The operation of the invention utilizes the functional operation of a hybrid coupler in which input energy received by an input arm cannot be directly transferred to an output arm, but must be first modified, usually in phase relation, and then delivered to the output arm for delivery to an external circuit. The modification of the energy between the input arm and the output arm is usually accomplished in two auxiliary side-arms which receive the energy from the input arm, then perform the desired transforming action, and then deliver the transformed energy to the output arm.

In the present invention, a modified form of hybrid, or hybrid coupler, is provided in which the two side-arms are arranged to have a quarter-wave phase relation to permit reflected energy waves from the two arms to be combined for partial cencellation and for partial addition. By arranging for such cancellation, as already stated, the reflection back into the energy source is prevented.

The attenuator herein specifically consists of a 3 db hybrid with two variable resistors used as termination resistors for the auxiliary side arms. By varying the two resistors synchronously, the reflection factors at the resistors may be varied equally. However, by special arrangement of the two side-arms of the hybrid, to be ninety degrees out of phase, the reflected energy waves from the two resistors may be controlled as desired to establish cancellation of partial reflection energy to prevent reflections back to the source, and to establish addition of partial reflection energy for delivery to the output arm. Thus, variation of the termination resistors provides for a range of attenuation by varying the reflection from zero to maximum at each termination resistor, then transmitting added portions of energy reflected from both resistors.

In one form of the invention, as disclosed herein, the hybrid coupler that is employed consists of a main or input strip transmission line and an auxiliary or output strip transmission line inductively coupled thereto. The two-strip lines are supported on and separated by a dielectric base, and two conductive planar elements are insulatingly supported in spaced relation relative to the striplines on the dielectric base to serve as ground planes for the respective strip lines. The two ground plane elements are conductively joined to provide a metallic enclosure to confine the energy of the two strip lines against radiation.

One object of the invention is to provide a variable microwave attenuator whose specific value of attenuation is independent of frequency, and is limited in frequency range only by the band-width of the hybrid.

Another object of the invention is to provide an attenuator employing a hybrid coupler in which simple variable resistive elements may be employed as terminations of two auxiliary arms, to vary the reflection constant at each of those terminations.

Another object of the invention is to provide a hybrid coupler having main input and ontput arms, with two intermediate auxiliary arms arranged to have a quarter-phase difference relative to said main input and output arms.

Another object of the invention is to provide a hybrid constructed of a main strip transmission line and an auxiliary strip transmission line coupled thereto with a 90 degree phase difference between the adjacent parts at each end of the stripline.

The details of construction of the attenuator and its manner of operation are described in the following specification, taken in connection with the accompanying drawings, in which FIGURE 1, is a schematic structural functional diagram of the attenuator embodying the invention;

Figure 1:
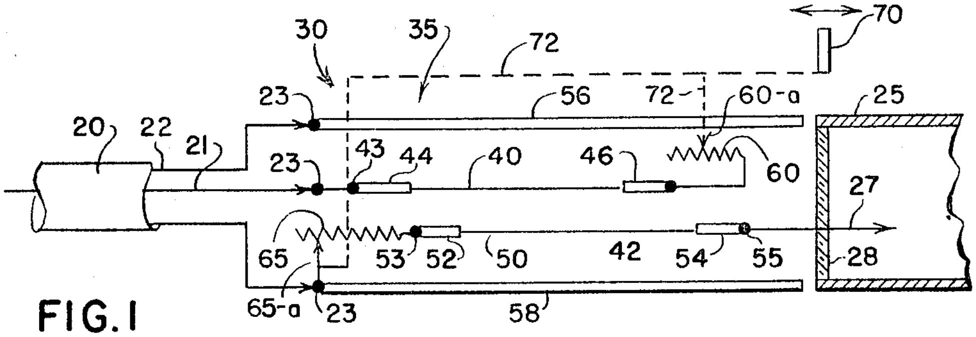

As shown in FIG. 1, energy from a supply source is fed through a coupling transmission input line 20 to a test or load microwave device or transmission line 25, through an attenuator 30. For simplicity the input line 20 is shown as a co-axial cable, with inner conductor 21 and outer conductor 22, and the output line or device 25 is shown as hollow waveguide with an exciting probe 27 extending through insulating end wall 28. The device 25 may be a microwave device as a load or unit under test, or it may be a transmission line as shown, with suitable coupling, or co-axial cable, to a load or unit under test.

The attenuator 30 is to control the ratio of energy transfer from input to output, and for that purpose employs a hybrid coupler 35 which comprises, as shown in FIG. 1, a main or input elongated stripline 40, supported on the upper surface of a planar dielectric base 42, and having an input arm 44 and a termination arm 46. On the lower surface of said planar dielectric base 42, is supported an auxiliary or output stripline 50, having a termination arm 52 and an output arm 54.

A conductive upper planar member 56 is disposed above and spaced from the upper stripline 40 to serve as a ground plane for that stripline 40. A similar conductive lower planar member 58, disposed below and spaced from lower stripline 50, serves as a ground plane for that stripline 50.

A terminating resistor 60 is connected between first terminating arm 46, of upper stripline 40, and the upper ground plane member 56. A similar paired resistor 65 is connected between the termination arm 52, of lower stripline 50, and the ground plane member 58.

Through suitable terminal coupling means, indicated at arrows 23, the input co-axial cable 20 is coupled to the input of the attenuator 30, with co-axial line 21 connected to input arm 44 and with co-axial outer conductor 22 connected to the two ground plane elements 56 and 58. Also, through suitable terminal coupling means, the output arm 54 of the attenuators and the ground plane elements 56 and 58 are coupled to the probe 27 and to the walls of test or load guide 25.

To vary the effect of the attenuator, in reducing the energy transferred from input to output, the two terminating resistors 60 and 65 are adjustably varied. That is accomplished through suitable means to assure that the similar paired resistors are equally and synchronously adjusted. For illustrative purposes, a common control handle or pin 70 is schematically shown as operative through schematic mechanical connections 72 to shift terminals **60–*a* and 65–*a* on the resistors 60 and 65**. It will be understood that any other type of variable resistor may be employed whether mechanically variable or voltage variable.

Figure 2:
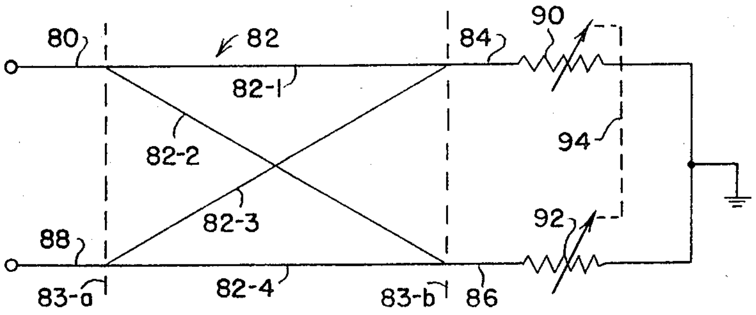
FIGURE 2 is a schematic circuit functional diagram of the attenuator of FIGURE 1.

In FIG. 2, the schematic diagram indicates how the input energy is partly absorbed and partly reflected to achieve the desired attenuation between input and output. An input transmission line 80 feeds energy into hybrid 82, indicated between dotted lines **83–*a* and 83–*b*, and the energy is divided between through and coupled arms 84 and 86, respectively, through paths 82–1 and 82–2 for delivery to the two terminating variable resistors 90 and 92, that are synchronously varied by suitable mechanisms 94. Some energy is absorbed in resistor 90 and the remainder of energy is reflected into arm line 84, and there divided into two quantities, one quantity a return or reflected backward quantity in hybrid path 82–1 and the other quantity a reflected forward quantity in hybrid path 82–3**.

By reason of the arrangement and operation of the hybrid, the two reflected backward quantities directed into hybrid paths 82–1 and 82–2 from arms 84 and 86, respectively, are directly opposite in phase, and consequently cancel out before re-entering the input line at arm 80. Therefore, no energy goes back to the source that feeds into input line 80.

Similarly, by reason of the hybrid operation, the two reflected forward quantities directed back into hybrid paths 82–3 and 82–4 from arms 84 and 86, respectively, will be in phase and will be additively combined in output line or arm 88, to an output test or load device that may be connected thereto.

Thus, by the simple operation of adjustably varying a pair of similar terminating resistors 90 and 92 in the auxiliary arms of a hybrid, when those auxiliary arms are caused to be operated in proper relative phase relation, here ninety degrees (90°), the combination can be controlled to function as an attenuator.

Figure 3:
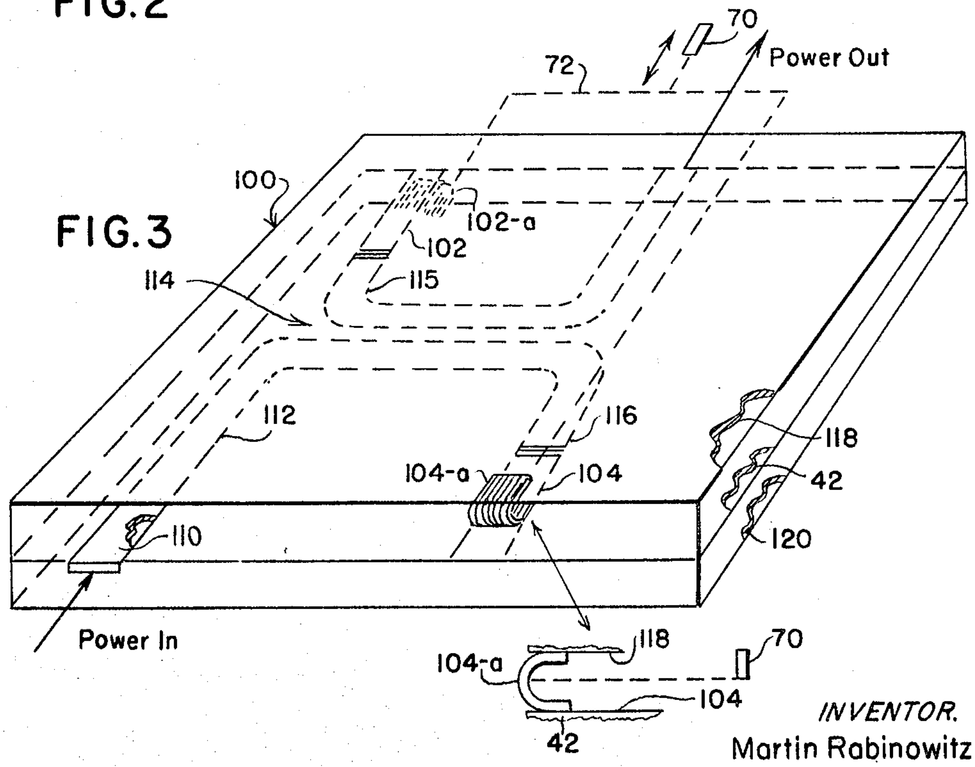
FIGURE 3 is a schematic pictorial functional diagram of the attenuator of FIGURE 1.

FIG. 3 shows pictorially a schematic functional arrangement of the elements of an attenuator 100, showing one type of variable strip resistor 102 and 104 with resilient movable terminals **102–*a* and 104–*a* in the form of conductive wiper elements. Energy enters the attenuator at 110 and travels down the strip transmission line 112, and enters the hybrid 114 and then divides between the two arms 115 and 116, continuing to the terminating resistors 102 and 104 at the ends of the arms 115 and 116, respectively. The conductive wiper elements 104–*a* and 102–*a* engage the resistive strips 104 and 102, respectively, and the related ground plane surfaces 118 and 120**, respectively.

To obtain the desired advantages of the angular disposition of the arms at the two ends of the hybrid assembly, the two stripline members of the hybrid are preferably, and more conveniently, arranged and disposed on opposite surfaces of an intermediate planar support such as the dielectric base 42 of FIG. 1. The details of the specific arrangement and disposition of the hybrid striplines are shown in more detail in FIGS. 4 and 5.

Figure 4:
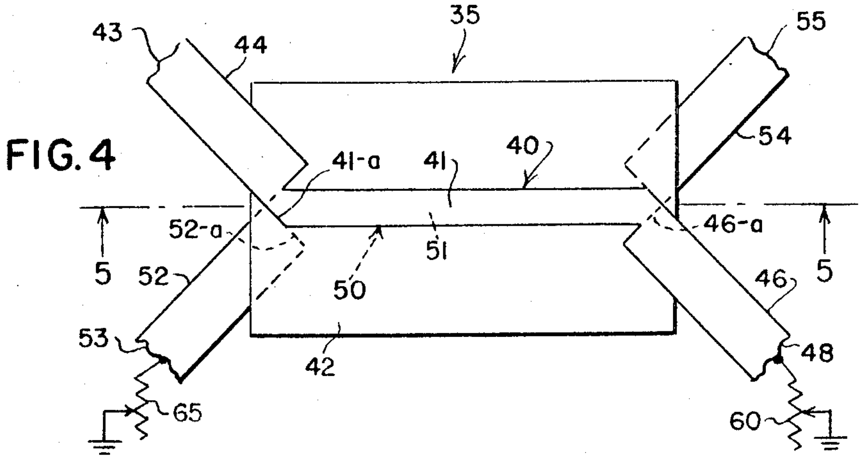
FIGURE 4 is a schematic plan view of the hybrid, showing two coupling strip lines on a supporting dielectric base.
Figure 5:
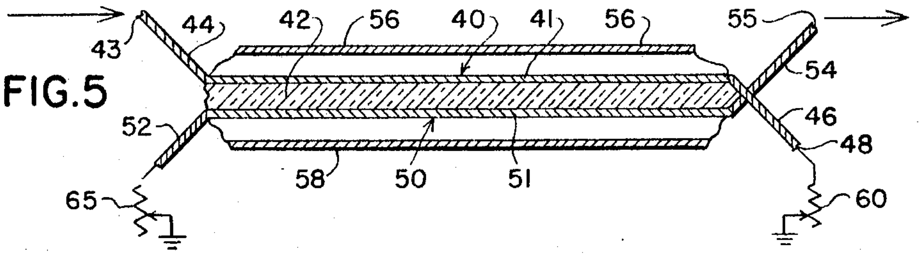
FIGURE 5 is a longitudinal vertical sectional view along lines 5—5 of FIGURE 4, with added planar elements above and below the base and stripline assembly of FIGURE 4 to serve as ground planes respectively for each adjacent stripline.

As shown in the plan and sectional views in FIGS. 4 and 5, the hybrid elements are identified by the same numerals as in FIG. 1. The upper hybrid arm 40 consists of strip line 41, input line 44 and terminating line 46. Input line 44 has an input port 43 and line 46 has a termination port 48.

The lower hybrid arm 50 consists of the strip line 51, the termination line 52 and the output line 54. The termination line 52 has a port 53 and the output line 54 has an outlet port 55.

The upper hybrid arm 40 with its connecting lines 44 and 46 are on the upper surface of the dielectric planar support 42, and the lower hybrid arm 50 and its connecting lines 52 and 54 are supported on the lower surface of planar support 42. The upper and the lower stripline elements 41 and 51 are congruent. The adjacent lines 44 and 52 are disposed at a right-angle to each other, each line at half a right-angle relative to its associated stripline.

In FIG. 5 are shown the conducting planar elements 56 and 58 that provide the ground planes for the respective two hybrid arms 40 and 50.

The terminating resistors 60 and 65, shown schematically in FIGS. 1 and 4, are preferably of the strip form shown as 102 and 104 in FIG. 3.

The operation of the attenuator may now be considered. Energy enters through port 43 and transmission line 44. Upon reaching the front end **41–*a* of stripline 41, the energy splits equally between upper arm 40 and lower arm 50. Energy continues toward the two resistors 60 and 65, where the energy is partially absorbed and partially reflected. The reflected energy from each resistor is divided into two parts, one part reflected from each resistor going backward toward the input line 44. These two backward-going reflected parts are out of phase and therefore cancel before re-entering line 44. The forward-going reflected parts from the two quantities of reflected energy, from the two resistors, are in phase, and re-combine to exit from the attenuator through line 54 to the output port 55**.

Figure 6:
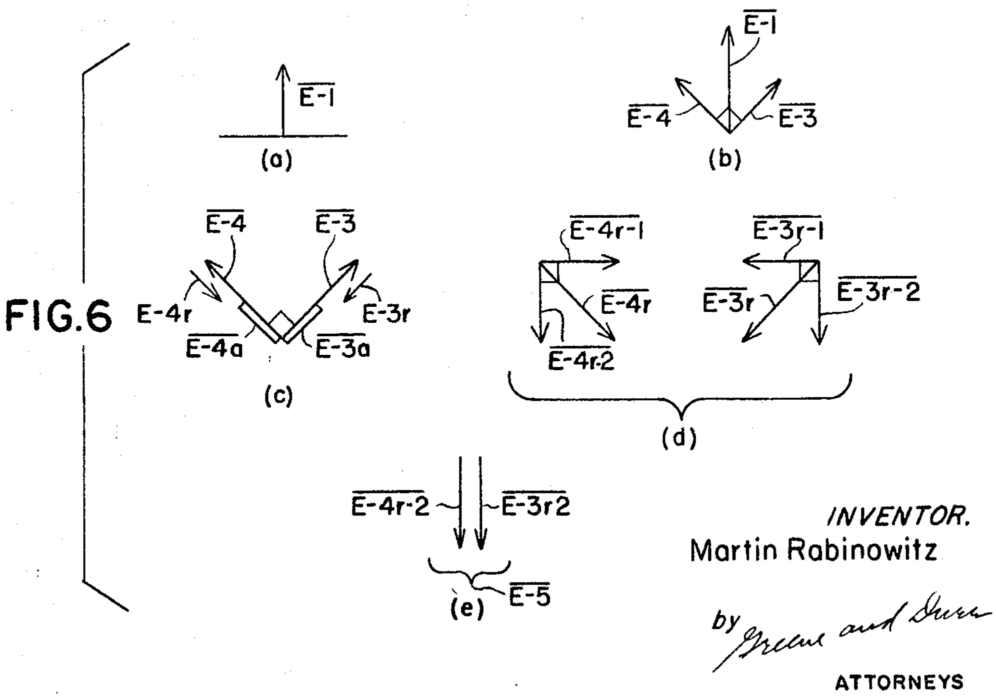
FIGURE 6 shows the various voltages and their phase relations at different locations in the attenuator.

The phase relations are indicated in the vector diagrams of FIG. 6. The input voltage $\overline{E-1}$ has the arbitrarily chosen phase shown in FIG. 6–*a*, as in line 44 of FIG. 4.

Voltage $\overline{E-1}$ into hybrid 35 is sub-divided in the hybrid into two equal voltages $\overline{E-3}$ and $\overline{E-4}$, at right-angles to each other, as at FIG. 6–B.

Thus $\overline{E-1}=\overline{E-3}+\overline{E-4}$, where the superscoring represents a vector quantity.

The two voltages $\overline{E-3}$ and $\overline{E-4}$ impinge upon the two resistors 60 and 65, respectively, where they are partially absorbed, as at $\overline{E-3a}$ and $\overline{E-4a}$, and partially reflected, as $\overline{E-3r}$ and $\overline{E-4r}$, respectively, as in FIG. 6–*c*. Those two reflected vectors $\overline{E-3r}$ and $\overline{E-4r}$ are also at right-angles to each other.

The magnitude of reflected voltage $\overline{E-3r}$ and $\overline{E-4r}$ will depend upon the characteristic impedance of the connected line, 46 or 52, and the setting of the variable resistor 60 or 65, in FIG. 4, or of the corresponding strip resistors 104 or 102 of FIG. 3.

The magnitude of the reflected voltage is thus $$|E-3r|=\frac{Ro-R}{Ro+R}|E-3|$$

where R*o* is the characteristic impedance of the connecting line to the terminating resistor and R is the value of the terminating resistance at the adjusted setting, and the vertical straight-line braces represent absolute or amplitude values, rather than vector quantities.

The reflected voltage $\overline{E-3r}$ from the resistor 60 returns to the hybrid where it is further subdivided at the hybrid, at region 46–*a*, into equal voltages $\overline{E-3r-1}$ and $\overline{E-3r-2}$, as in FIG. 6 (*d*). Similarly, the reflected voltage $\overline{E-4r}$ from the resistor 65 is subdivided at region 52–*a* into voltages $\overline{E-4r-1}$ and $\overline{E-4r-2}$, as in FIG. 6 (*d*).

The reflected voltage components $\overline{E-4r-1}$ and $\overline{E-3r-1}$ of the FIG. 6 (*d*) are out of phase at region 52–*a* of the hybrid and therefore cancel, so there is no voltage reflected back into the source from the hybrid and from the attenuator.

At the same time, the other components $\overline{E-3r-2}$ and $\overline{E-4r-2}$, as shown in FIG. 6 (*d*) are in phase and combine as in FIG. 6 (*e*) to provide voltage $E-5$ at the output of the hybrid into output line 54 and thence to the output port 55, for delivery to an external circuit, such as the test or load device indicated in FIG. 1 as waveguide 25.

Thus, $$\overline{E-5}=\overline{E-3r-2}+\overline{E-4r-2}$$

The power attenuation is then given by the formula $$\text{Attenuation}=20\log\frac{|E-1|}{|E-5|}$$

Thus by means of a hybrid arranged to provide subdivision of voltages by the arms of the hybrid at right angles, and by variably changing the absorption and reflection ratios at the terminating ends of the intermediate arms, a simple gradually variable attenuator can be achieved.

To control the absorption and reflection ratios at the terminations of the hybrid arms, any type of suitable variable resistance device may be employed. For the purpose of this invention, the resistance devices should show pure resistance values to the hybrid.

The particular feature of advantage herein is the provision of a simple attenuator for micro-miniaturization of test and control equipment.

Variations may be made in the construction and disposition of the elements of the attenuator without departing from the scope and spirit of the invention as set forth in the appended claims.

I claim:

1. An attenuator for use in a microwave circuit comprising (1) an input microwave line, (2) a hybrid structure to receive input energy from said microwave line and to transmit a selected portion of such input energy by locally absorbing a portion of said input energy and comprising (a) a first linear stripline, as a first arm, having an input end and a terminating end, (b) a second linear stripline, as a second arm, separated from said first arm by a coupling dielectric, and having a terminating end and an output end, (3) variably-adjustable energy-absorbing means coupled to said hybrid structure for absorbing a portion of said input energy and for reflecting the remainder of said input energy to provide the quantity of energy desired as output energy and comprising (a′) a first variable resistance termination connected to said terminating end of said first arm, (b′) a similar second variable resistance termination on said terminating end of said second arm, (c′) means for synchronously varying said two variable resistances equally to establish equal termination values, (4) an output line to transmit output energy to an external circuit and, (5) means coupling said output line to the output end of said second arm.

2. An attenuator as in claim 1, having an upper electrically conducting planar element insulatingly spaced above said first linear stripline;

a lower electrically conducting planar element insulatingly spaced below said second linear element;

and means electrically connecting said upper and lower planar elements to serve as ground planes for said two respective linear striplines.

References Cited by the Examiner

UNITED STATES PATENTS

| | | | |
|---|---|---|---|
| 2,812,500 | 11/1957 | Riblet | 333—11 |
| 2,913,686 | 11/1959 | Fubini et al. | 333—84 |
| 3,105,210 | 9/1963 | Riblet | 333—81 |

OTHER REFERENCES

Fubini, E.; Fromm, W.; and Keen, H.: "New Techniques for High-Q Strip Microwave Components," Convention Record of the IRE 1954 National Convention, Part 8, Communications and Microwave, pages 91–97.

Shimizu, J. K.: "Strip-Line 3 db Directional Couplers," Convention Record of the IRE WESCON, 1957, vol. 1, pages 4–15.

HERMAN KARL SAALBACH, *Primary Examiner.*

A. R. MORGANSTERN, E. LIEBERMAN, *Assistant Examiners.*